US008534594B2

(12) United States Patent
Wang et al.

(10) Patent No.: US 8,534,594 B2
(45) Date of Patent: Sep. 17, 2013

(54) VIBRATION ISOLATION SYSTEM USING ELECTRICAL CABLES AS MASS

(75) Inventors: Tongan Wang, Garden City, GA (US); David C. Hornick, Midway, GA (US); John W. Maxon, Jr., Richmond Hill, GA (US); Andrew S. Foose, Savannah, GA (US); Josef A. Fila, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 338 days.

(21) Appl. No.: 13/084,200

(22) Filed: Apr. 11, 2011

(65) Prior Publication Data

US 2012/0256048 A1 Oct. 11, 2012

(51) Int. Cl.
*B64C 1/40* (2006.01)
*B64C 1/00* (2006.01)
*F16M 11/00* (2006.01)

(52) U.S. Cl.
USPC .......... 244/1 N; 244/119; 244/129.1; 248/560

(58) Field of Classification Search
USPC .......... 244/1 N, 119, 129.1; 52/167.1, 167.2, 52/167.3, 167.4, 167.5, 167.6, 167.7, 167.8, 52/167.9, 1; 248/560, 618, 619, 622; 138/106, 138/107; 174/486, 482, 505; 267/136, 140.11, 267/140.13; 188/378, 379, 380
See application file for complete search history.

(56) References Cited

U.S. PATENT DOCUMENTS

| 1,972,005 | A | * | 8/1934 | Berbeck | 244/119 |
|---|---|---|---|---|---|
| 3,028,138 | A | * | 4/1962 | Wells | 248/619 |
| 3,606,218 | A | * | 9/1971 | Enlund | 248/74.2 |
| 4,088,042 | A | | 5/1978 | Desjardins et al. | |
| 4,140,028 | A | | 2/1979 | Desjardins | |
| 4,259,541 | A | | 3/1981 | Bouche | |
| 4,365,770 | A | | 12/1982 | Mard et al. | |

(Continued)

FOREIGN PATENT DOCUMENTS

JP 2005280546 10/2005
WO WO2009/074669 A1 6/2009

OTHER PUBLICATIONS

Boeing Commercial Airplane Company, YC-14 Interior Noise Measurements Program, Mar. 1981, Technical Report AFFDL-TR-77-128, Final Report Oct. 1975 -Oct. 1977, 149 pgs.

(Continued)

*Primary Examiner* — Rob Swiatek
*Assistant Examiner* — Marc Burgess
(74) *Attorney, Agent, or Firm* — Ingrassia Fisher & Lorenz, P.C.

(57) ABSTRACT

A vibration isolation system for attenuating vibration energy between two aircraft structures, such as between the aircraft's fuselage and interior cabin. The vibration isolation system includes a first isolator attached to the first structure, a second isolator attached to the second structure, and an intermediate mass attached between the first and second isolators. The intermediate mass may be electrical cables, wiring bundles, a cable holder, or other component disposed between the two structures. Cable holder intermediate masses can be fabricated from an electrically conductive material to provide electromagnetic interference shielding for cables disposed therein. Multiple vibration isolation systems can be disposed between the fuselage and interior cabin to provide a less noisy cabin. Additional noise and vibration suppressors, such as skin damping material and acoustic blankets, also can be disposed between the fuselage and interior cabin to further reduce noise in the interior cabin.

27 Claims, 7 Drawing Sheets

(56) References Cited

U.S. PATENT DOCUMENTS

| | | | |
|---|---|---|---|
| 4,534,526 A | 8/1985 | Metzger et al. | |
| 4,550,812 A * | 11/1985 | Mard | 244/17.11 |
| 4,725,019 A | 2/1988 | White | |
| 5,094,268 A | 3/1992 | Morel et al. | |
| 5,620,068 A | 4/1997 | Garnjost et al. | |
| 5,895,013 A | 4/1999 | Towfiq | |
| 5,904,318 A | 5/1999 | Towfiq | |
| 5,984,233 A | 11/1999 | Snyder, Jr. et al. | |
| 6,009,985 A * | 1/2000 | Ivers | 244/54 |
| 6,158,690 A | 12/2000 | Wadey et al. | |
| 6,394,432 B1 | 5/2002 | Whiteford | |
| 6,431,530 B1 | 8/2002 | Stamps et al. | |
| 6,467,723 B1 | 10/2002 | Rossetti et al. | |
| 6,743,976 B2 * | 6/2004 | Motzigkeit | 174/486 |
| 7,040,575 B2 | 5/2006 | Struve et al. | |
| 7,146,147 B1 | 12/2006 | Sabatino | |
| 7,246,772 B2 | 7/2007 | Drost et al. | |
| 7,461,816 B2 * | 12/2008 | Schwartz et al. | 244/117 R |
| 7,665,708 B2 | 2/2010 | Stothers et al. | |
| 7,800,845 B2 * | 9/2010 | Mansfield | 359/811 |
| 8,061,390 B2 * | 11/2011 | Condon et al. | 248/214 |
| 2003/0221851 A1 | 12/2003 | Motzigkeit | |
| 2004/0094665 A1 | 5/2004 | Roson et al. | |
| 2008/0250626 A1 | 10/2008 | Frankenberger et al. | |
| 2010/0109219 A1 | 5/2010 | Melz et al. | |

OTHER PUBLICATIONS

US Patent Office, International Searching Authority, "International Search Report" mailed Jul. 13, 2012; International Appln. No. PCT/US2012/33124, filed Apr. 11, 2012.

* cited by examiner

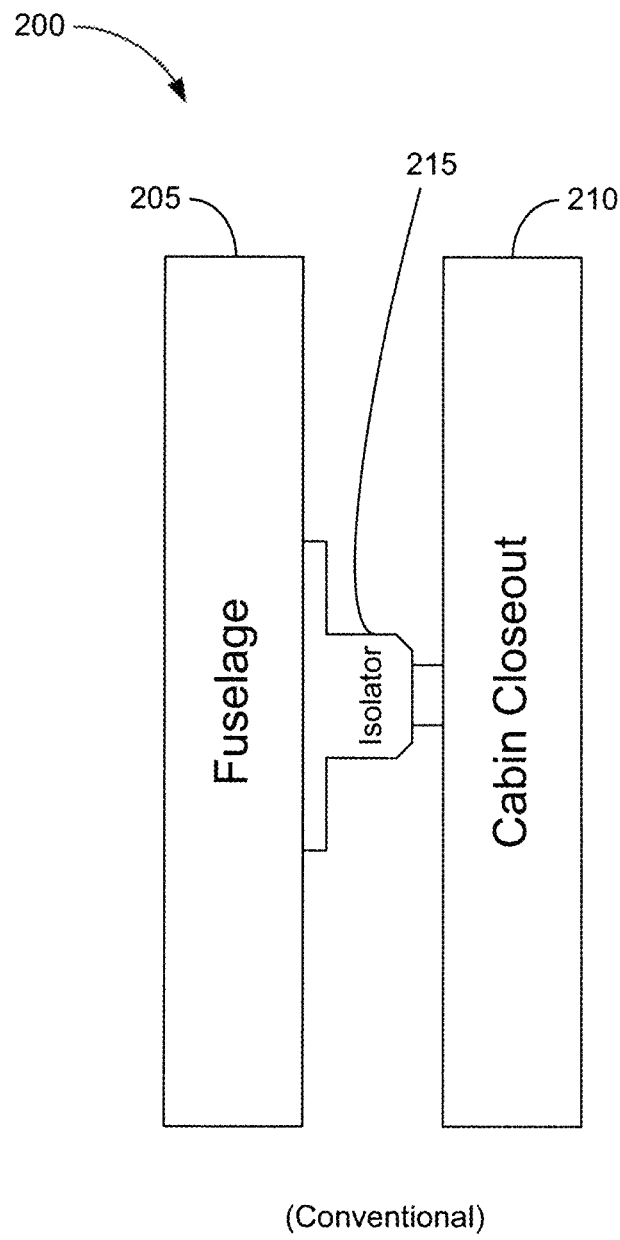
(Conventional)
Fig. 2

VIBRATION ISOLATION SYSTEM USING ELECTRICAL CABLES AS MASS

TECHNICAL FIELD

The present disclosure relates generally to vibration isolation systems and, more specifically, to an aircraft vibration isolation system having two isolators and an intermediate mass attached between the two isolators.

BACKGROUND

Controlling the interior noise level within an aircraft is a major concern for aircraft manufacturers and operators. One major source of noise is the turbulent boundary layer ("TBL") noise on the aircraft's exterior surface. Referring to FIG. 1, TBL wall pressure fluctuations 125 typically take the path of least resistance to transmit noise into the interior cabin 150 of an aircraft. One of these paths is through the buildup formed by the fuselage's skin 105, a sound absorptive layer 107, and interior closeout panels 110. This path is referred to as the "acoustic path" 140, which generally has high transmission loss. Another path is the "structural path" 150 formed by interior structures that are mounted to the fuselage airframes. These interior structures are often mounted to the fuselage with vibration isolators. However, these vibration isolators form a potentially 'easier' path for the TBL noise to transmit to the interior cabin at high frequencies.

Referring to FIG. 2, conventional aircraft vibration isolation systems 200 typically include a single vibration isolator 215 disposed between an aircraft's fuselage 205 and a cabin interior closeout panel 210. The aircraft may have a multitude of these single isolator systems 200 disposed throughout the space between the fuselage 205 and cabin interior closeout panels 210. However, conventional single isolator systems 200 still allow significant noise into the interior cabin of aircraft. Single isolator systems also may transmit more noise to the interior cabin for a composite fuselage compared to an aluminum or other metallic fuselage.

One method of vibration isolation for aircraft involves using heavier closeout structures. This additional weight can impair the performance of the aircraft.

Accordingly, a need exists in the art for an improved vibration isolation system for reducing noise in interior aircraft cabins without adding unnecessary weight to the aircraft.

SUMMARY

The present invention provides a vibration isolation system for controlling the transmission of vibrations and noise between two objects or structures. The vibration isolation system can be installed in an aircraft to reduce the level of noise in the aircraft's interior cabin caused by vibration energy or noise transmitted from the airframe structure or fuselage to the interior cabin. The vibration isolation system can include a first isolator attached to the airframe structure, a second isolator attached to an interior wall or interior closeout panel of the cabin, and an intermediate mass attached between the first and second isolators. Multiple vibration isolation systems can be disposed throughout the cavity between the airframe structure and the interior wall to attenuate vibration energy that would otherwise be transmitted more efficiently from the airframe structure to the interior cabin. The vibration isolation systems can be arranged in one or more rows along the length of the fuselage. The vibration isolation systems can be spaced within those rows at regular or semi-regular intervals. Additional noise and vibration suppression elements, such as acoustic blankets and fuselage skin damping materials, also can be installed in the aircraft to further reduce the level of unwanted noise in the interior cabin.

In certain aspects, existing components or components disposed in the cavity between the airframe structure and the interior wall can be used as the intermediate mass. For example, electrical cables or wiring bundles routed through the cavity may be used as the intermediate mass. These wiring bundles may include power and system cables that are normally routed through the cavity. In another example, a cable holder, cable tray, cable trough, or other type of cable management system disposed in the cavity may be used as the intermediate mass. The cable management system may be fabricated from an electrically conductive material to also provide electromagnetic interference ("EMI") shielding for the wiring bundles.

In one aspect of the present invention, a system for reducing noise in an aircraft cabin can include a first isolator attached to the aircraft's fuselage. A second isolator can be attached to an interior closeout of the cabin. An intermediate mass can be attached between the first isolator and the second isolator.

In another aspect of the present invention, an aircraft can include a fuselage having an inner wall and an outer wall. An interior cabin of the aircraft can be defined by an interior closeout having an inner surface facing the cabin and an outer surface facing the inner wall. The aircraft can include a cavity between the inner wall and the outer surface. Vibration isolators can be disposed in the cavity and attached between the inner wall and the outer surface. Each vibration isolator can include a first vibration isolator attached to the inner wall, a second vibration isolator attached to the outer surface, and an intermediate mass attached between the first isolator and the second isolator.

In yet another aspect of the present invention, an aircraft can include a fuselage having an inner wall and an outer wall. An interior cabin can be defined by an interior closeout having an inner surface facing the cabin and an outer surface facing the inner wall. The aircraft can include a cavity between the inner wall and the outer surface. An electrical cable holder can be disposed in the cavity for holding one or more electrical cables. Vibration isolators also can be disposed in the cavity. Each vibration isolator can include a first isolator attached between the inner wall and the cable holder and a second isolator attached between the outer surface and the cable holder.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which:

FIG. 2 is a block diagram depicting a conventional single isolator system;

Figure 1:
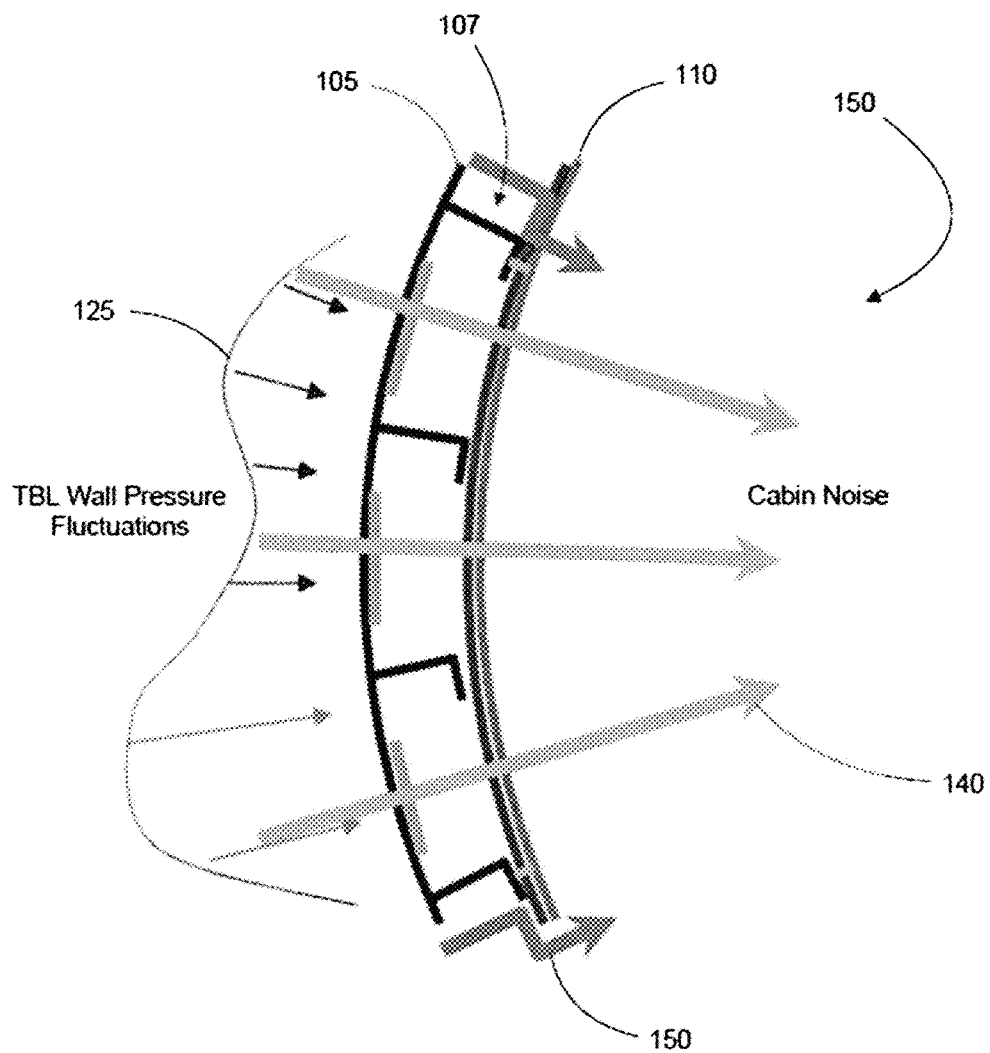
FIG. 1 depicts transmission of Turbulent Boundary Layer ("TBL") noise on an aircraft exterior surface to the aircraft interior cabin.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon illustrating the principles of exemplary embodiments of the present invention. Additionally, certain dimensions may be exaggerated to help visually convey such principles.

DETAILED DESCRIPTION OF EXEMPLARY EMBODIMENTS

The present invention provides a vibration isolation system for attenuating vibration energy between two aircraft structures, such as between the aircraft's fuselage and interior cabin. The vibration isolation system includes a first isolator attached to the first structure, a second isolator attached to the second structure, and an intermediate mass attached between the first and second isolators. To minimize weight impact, the intermediate mass may be electrical cables, wiring bundles, a cable holder, or other component normally disposed between the two structures. Cable holder intermediate masses can be fabricated from an electrically conductive material to provide electromagnetic interference ("EMI") shielding for cables disposed therein. Multiple vibration isolator systems can be disposed between the fuselage and interior cabin to provide a less noisy cabin. Additional noise and vibration suppressors, such as skin damping material and acoustic blankets, also can be disposed between the fuselage and interior cabin to further reduce noise in the interior cabin.

The following description of exemplary embodiments refers to the attached drawings. Any spatial references herein such as, for example, "upper," "lower," "above," "below," "rear," "between," "vertical," "angular," "beneath," etc., are for the purpose of illustration only and do not limit the specific orientation or location of the described structure.

Referring now to the figures, in which like numerals represent like (but not necessarily identical) elements throughout the figures, exemplary embodiments of the invention are described in detail.

Figure 3:
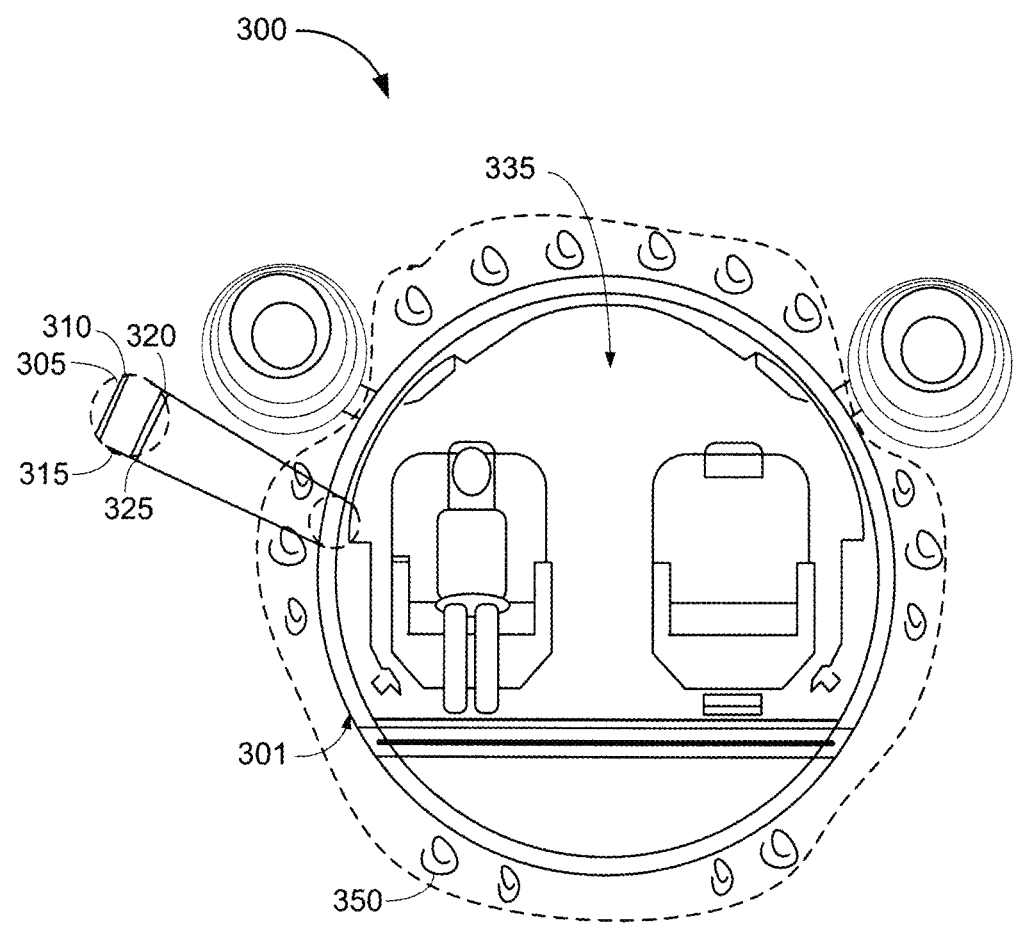
FIG. 3 is a cross-sectional view of an aircraft, in accordance with certain exemplary embodiments.

FIG. 3 is a cross-sectional view of an aircraft 300, in accordance with certain exemplary embodiments. Referring to FIG. 3, the exemplary aircraft 300 includes a fuselage 301 and an interior cabin 335 inside the fuselage 301. Also shown in FIG. 3 is turbulent boundary layer ("TBL") noise 350 on the exterior of the fuselage 301. If unimpeded, the TBL noise 350 can cause vibration energy to be transmitted efficiently into the interior cabin 335 that, in turn, results in a noisy cabin. This TBL noise can be transmitted into the interior cabin 335 by way of an "acoustic path" through the buildup formed by a fuselage skin 305, a sound absorptive layer 315, and interior closeout panels 325. The noise also can be transmitted into the interior cabin 335 by way of a "structural path" through vibration isolators (not shown in FIG. 3; refer to FIG. 1) connected between the fuselage 301 and interior structures. Engine noise and vibrations also can be transmitted to the interior cabin 335 via the acoustic and structural paths.

The transmissions of vibrations and noise into the interior cabin 335 can be attenuated by incorporating one or more vibration or sound absorbing elements between the fuselage skin 305 and the interior closeout panels 325, which form the interior wall of the cabin 335. For example, the illustrated embodiment includes a skin damping material 310 that covers the inner wall of the fuselage 301 and an acoustic blanket 320 that covers the exterior wall of the interior closeout panels 325. In certain exemplary embodiments, the skin damping material 310 includes a skin damping foam.

In addition to or in place of the aforementioned noise attenuation elements, a multitude of vibration isolation systems may be disposed between the fuselage 301 and the interior cabin 335. The vibration isolation systems can attenuate vibrations that would otherwise be transmitted much more efficiently to the interior cabin 335 by way of the structural path. An exemplary vibration isolator system 400 that can be utilized for this purpose is illustrated in FIG. 4.

Figure 4:
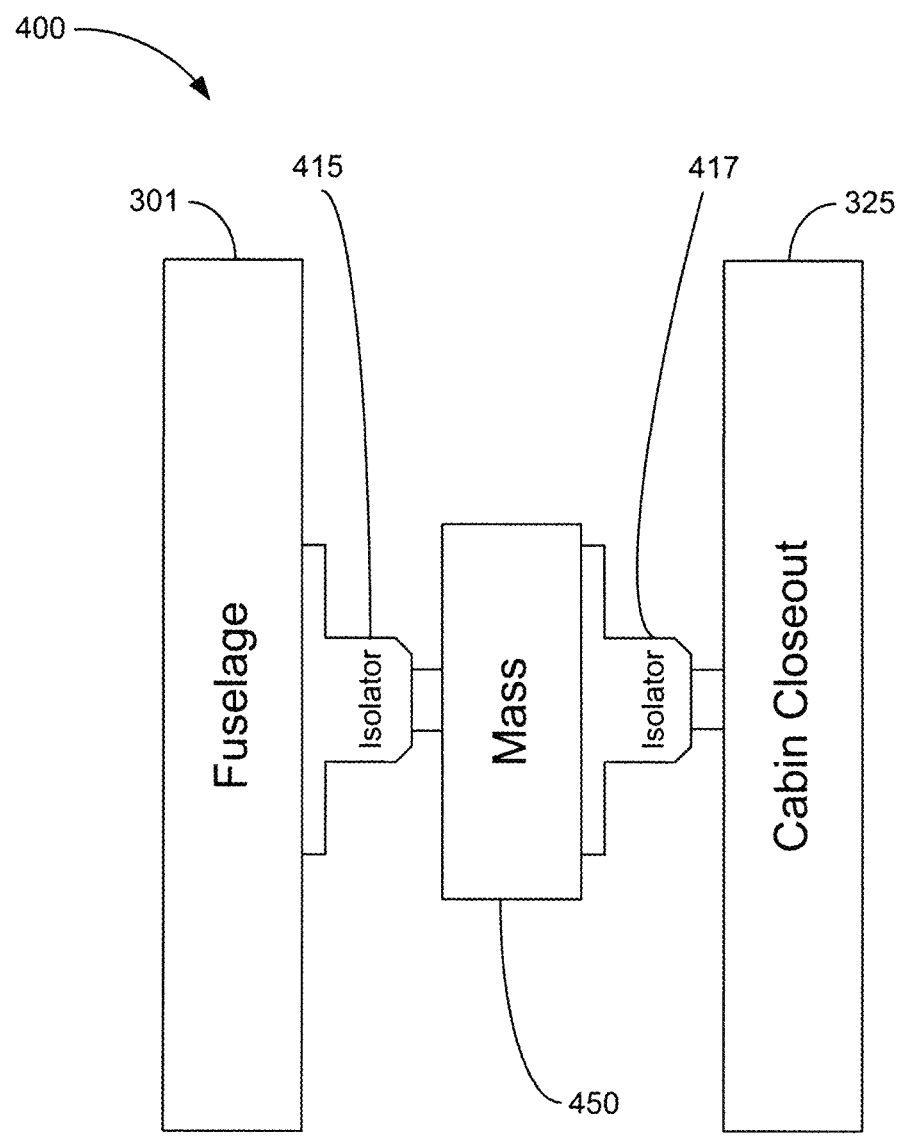
FIG. 4 is a block diagram depicting a vibration isolation system having two isolators and an intermediate mass, in accordance with certain exemplary embodiments.

FIG. 4 is a block diagram depicting a vibration isolation system (hereinafter "double-isolator system" 400) having two isolators 415, 417 and an intermediate mass 450. Referring now to FIGS. 3 and 4, one or more double-isolator systems 400 may be disposed between the fuselage 301 and the interior cabin 335 to attenuate vibration energy that would otherwise cause much higher noise in the interior cabin 335. The exemplary double-isolator system 400 includes a first isolator 415 attached to the inner wall of the fuselage 301, a second isolator 417 attached to the interior closeout panel 325 (or another interior structure of the aircraft 300), and an intermediate mass 450 attached between the first isolator 415 and the second isolator 417. In certain exemplary embodiments, the isolators 415, 417 are vibration isolators, similar to the isolator 215 illustrated in FIG. 2 and discussed above.

The isolators 415, 417 can include any type of resilient mounting element, such as metal springs, molded elastomeric components, pads or slabs of resilient materials, or combinations the aforementioned elements. Typically, the isolators 415, 417 include a housing with attachment devices or mechanisms suitable for specific applications. For example, the isolator 415 can include one or more attachment devices suitable for attaching to the interior wall of the fuselage 415 and one or more attachment devices suitable for attaching the intermediate mass 450. Similarly, the isolator 417 can include one or more attachment devices suitable for attaching to interior closeout panels 325 and one or more attachment devices suitable for attaching the intermediate mass 450. The stiffness of the isolators 415, 417 can be customized to enable the isolators 415, 417 to provide sufficient structural attenuation as well as to satisfy structural load requirements.

In certain exemplary embodiments, multiple double-isolator systems 400 are arranged in rows along the length of the fuselage 301. The double-isolator systems 400 in each row can be spaced apart at regular, semi-regular, or non-regular intervals. For example, the double-isolator systems 400 may be spaced apart by 24" in certain exemplary embodiments. The spacing can vary based on the type of isolators 415, 417, the material of the fuselage 301, the material of the cabin closeout 325, the intermediate mass 450, and the amount of acoustical attenuation desired. In certain exemplary embodiments, the rows of double-isolator systems 400 are configured such that double-isolator systems in one row are substantially aligned with double-isolator systems 400 in an adjacent row. In certain exemplary embodiments, the rows of double-isolator systems 400 are configured such that double-isolator systems in one row are substantially offset or staggered with respect to double-isolator systems 400 in an adjacent row.

The use of two isolators 415, 417 with the intermediate mass 450 disposed between the two isolators 415, 417 can increase the amount of acoustic vibration attenuation achieved by the double-isolator system 400. For example, FIGS. 7 and 8 depict exemplary attenuation gains realized by an exemplary double-isolator system 700 illustrated in FIG. 7.

Figure 8:
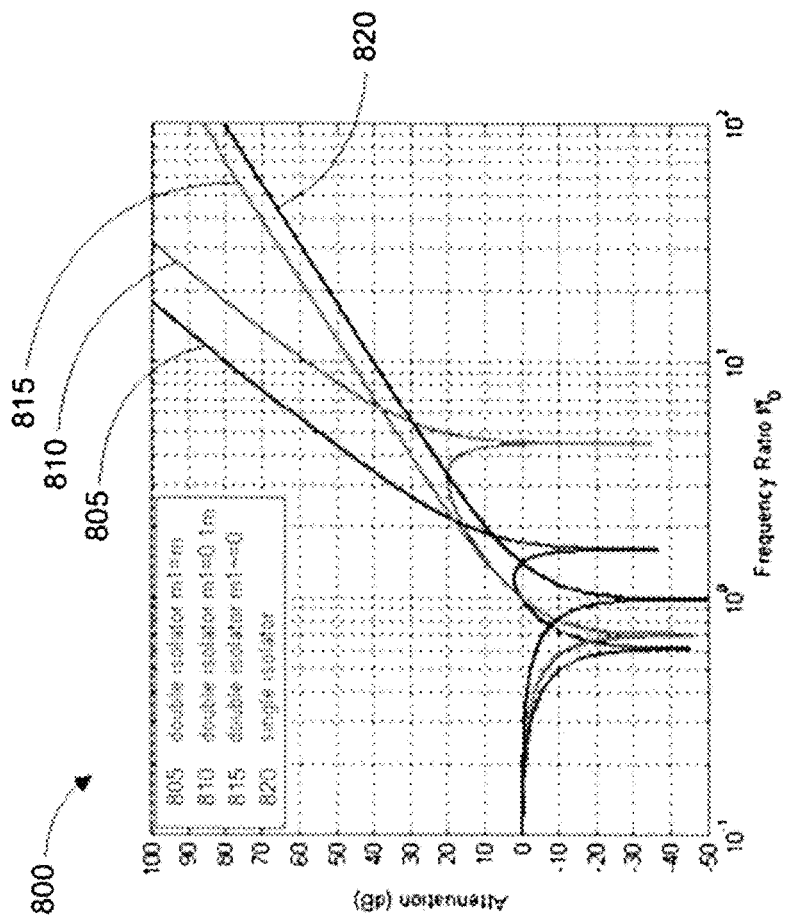
FIG. 8 is a graph depicting structural attenuation of several isolation systems, in accordance with certain exemplary embodiments.
Figure 7:
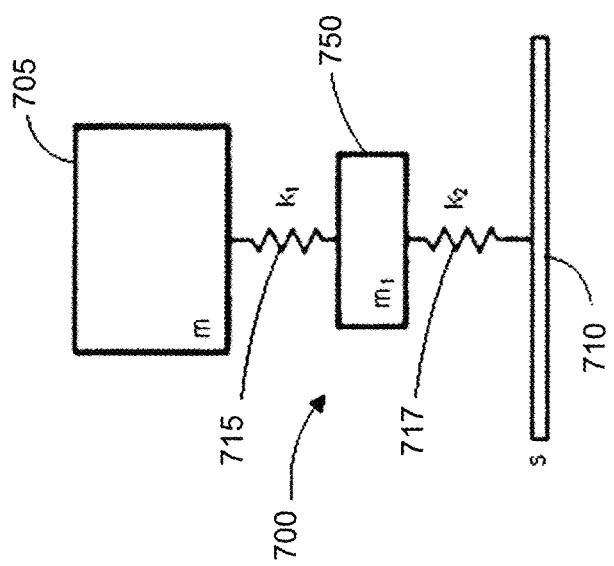
FIG. 7 is a block diagram depicting a vibration isolation system having two isolators and an intermediate mass, in accordance with certain exemplary embodiments.

FIG. 7 is a block diagram depicting an exemplary double-isolator system 700 attached between two structures 705, 710, and FIG. 8 is a graph 800 depicting structural attenuation of several isolator systems, including several implementations of the double-isolator system 700. Referring to FIGS. 7 and 8, the double-isolator system 700 includes a first isolator 715 attached between a structure 705 having a mass "m" and an intermediate mass 750 having a mass "$m_1$." The double-isolator system 700 also includes a second isolator 717 attached between a structure 710 and the intermediate mass 750. The double-isolator system 700 attenuates vibrations of the structure 710 that would otherwise be transmitted to the structure 705 more efficiently. Thus, the structure 705 can be referred to as an "isolated structure," and the structure 710 can be referred to as a "source structure."

The graph 800 depicts the amount of attenuation realized by several configurations of the double-isolator system 700 and a single isolator system for a range of normalized frequencies ($f/f_0$). In particular, the graph 800 illustrates the amount of attenuation achieved by the double-isolator system 700 using different weights of intermediate mass 750 between the isolators 715, 717 and the amount of attenuation achieved by a conventional single isolator system. A first attenuation curve 805 depicts the amount of attenuation achieved by the double-isolator system 700 with an intermediate mass 750 having a weight substantially equal to the weight of the isolated structure 705; a second attenuation curve 810 depicts the amount of attenuation achieved by the double-isolator system 700 with an intermediate mass 750 having a weight of about 10% of the weight of the isolated structure 705; a third curve 815 depicts the amount of attenuation achieved by the double-isolator system 700 with an intermediate mass having a weight of approximately zero; and a fourth curve 820 depicts the amount of attenuation achieved by a conventional single isolator system.

As shown in the graph 800, the use of an intermediate mass 750 between two structures 705, 710 can greatly increase the amount of vibration attenuation compared to a single isolator system, especially at high frequencies. In addition, the use of a higher weight intermediate mass 750 relative to the weight of the isolated structure 705 results in better vibration attenuation than a lower weight intermediate mass 750.

If an intermediate mass (m~=0) does not exist between the two isolators 715, 717, the double-isolator system 700 behaves similarly to a single isolator system with halved stiffness, as shown by the similarities between curves 815 and 820. If 10% of the weight of the isolated structure 705 is introduced between the two isolators 715, 717 as the intermediate mass 750, the attenuation of the double-isolator system 700 proves to be much higher than the single isolator system above the vibration isolation system's resonant frequency. For the isolators used in aircraft, the interested frequency range where isolator behavior becomes important is typically well above this resonant frequency, making the double-isolator system 700 very effective for aircraft applications.

Referring back to FIGS. 3 and 4, introducing a new intermediate mass 450 onto the aircraft 300 for use with the double-isolator system 400 adds additional weight to the aircraft 300. To minimize the weight impact, an existing object or structure that would normally be included on the aircraft 300 could be utilized as the intermediate mass 450. For example, electrical wiring bundles for power or system cables could serve as the intermediate mass 450. These wiring bundles typically provide sufficient weight to serve as the intermediate mass 450 between the two isolators 415, 417. Wiring bundles also are typically routed between the fuselage 301 and the interior closeout panels 325, making the wiring bundles especially useful for this application.

Figure 5:
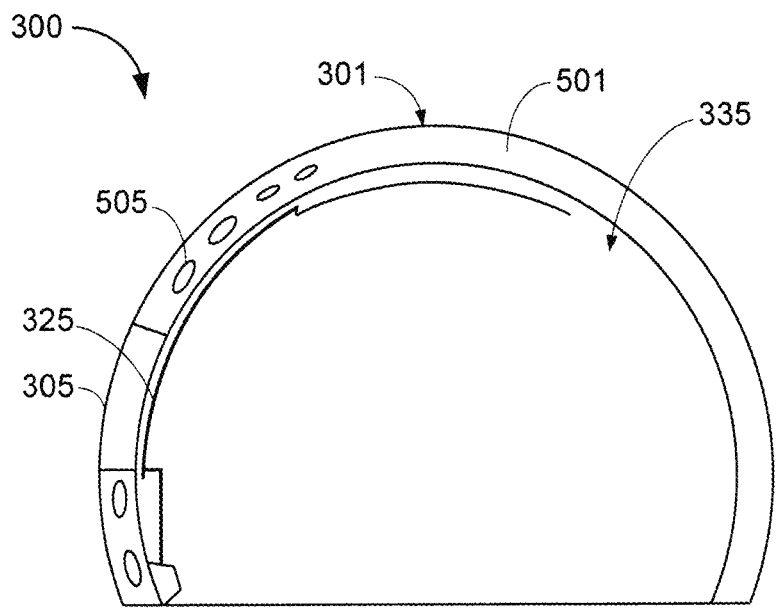
FIG. 5 is cross-sectional view of a portion of the aircraft of FIG. 3, in accordance with certain exemplary embodiments.

FIG. 5 is another cross-sectional view of a portion of the aircraft 300, in accordance with certain exemplary embodiments. Referring to FIG. 5, the aircraft 300 includes a multitude of wiring bundles 505 disposed in a cavity 501 between the fuselage 301 and the interior cabin 335. The wiring bundles 505 can include power and/or system cables routed between electrical components of the aircraft 300. One or more of these wiring bundles 505 could serve as the intermediate mass 450 of one or more double-isolator systems 400. That is, the isolators 415, 417 of one or more double-isolator systems 400 may be attached to wiring bundles 505. For example, the isolator 415 may be attached between the fuselage 301 and a wiring bundle 505, and the isolator 417 may be attached between an interior closeout panel 325 and the wiring bundle 505.

Multiple double-isolator systems 400 may utilize a single wiring bundle as the intermediate mass 450. For example, wiring bundles are often routed in a direction from the front of the aircraft 300 towards the rear of the aircraft 300. Double-isolator systems 400 may be disposed lengthwise along aircraft 300 between the fuselage 301 and the interior cabin 335. The double-isolator systems 400 may be arranged in a multitude of substantially straight rows from the front of the aircraft 300 towards the rear of the aircraft 300. Double-isolator systems 400 in one row may utilize the same wiring bundle that also runs in the same direction as the row and proximal to the row.

Wiring bundles 505 are often routed in cable trays, cable troughs, cable holders, or other cable management systems in aircraft 300. These cable management systems (for example, cable tray 610 discussed hereinafter with reference to FIG. 6) also can be used as the intermediate mass 450 for one or more double-isolator systems 400. The weight of the cable management system adds additional weight to the intermediate mass 450 and can lead to better noise and vibration attenuation.

The wiring bundles used on an aircraft 300 having a composite fuselage 301 often require additional EMI protection as the composite fuselage 301 is not as electrically conductive as a metallic fuselage 301. For example, wires and cables installed in an aircraft 300 having a composite fuselage 301 often include individual EMI shielding for each cable or wiring bundle. This additional EMI protection can add additional weight to the wiring system and thus, the aircraft 300. One way to obviate at least a portion of this additional weight is to fabricate the cable management system with an electrically conductive material. The electrically conductive cable management system can provide EMI protection for wires and cables routed therein, eliminating the need for individual shielding.

Figure 6:
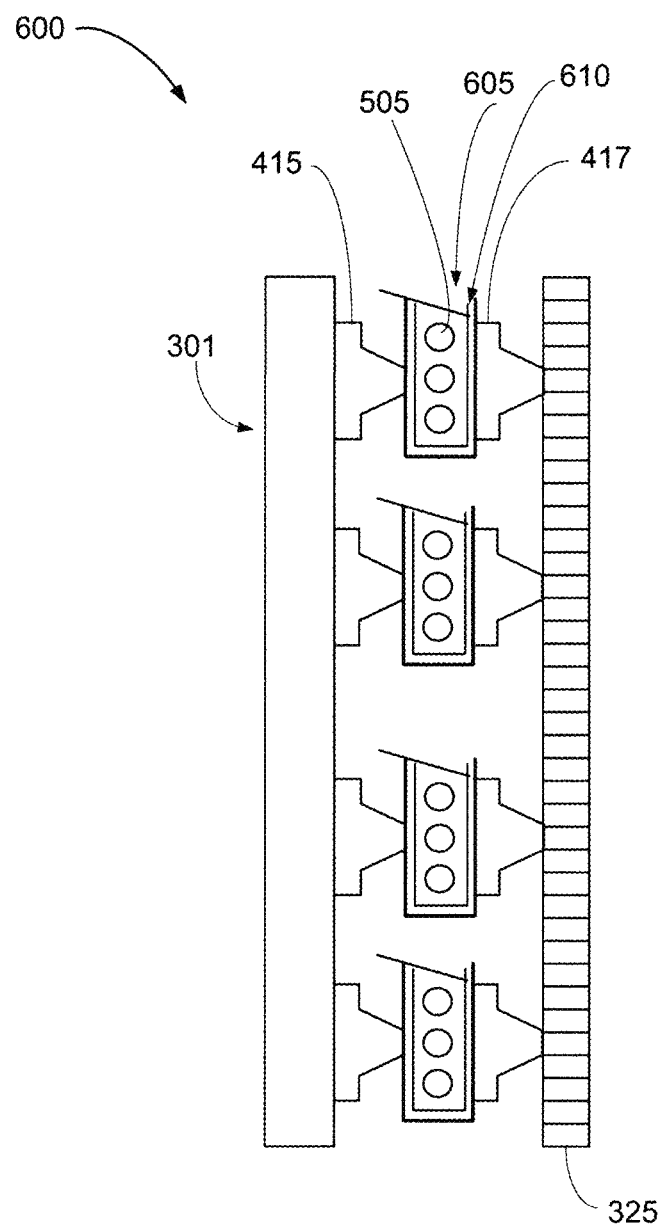
FIG. 6 is a cross-sectional view of a cavity between an aircraft's fuselage and interior cabin closeout, in accordance with certain exemplary embodiments.

As shown in FIG. 6, the electrically conductive cable management system also can be used as the intermediate mass 450 for one or more double-isolator systems 400. Thus, introducing a conductive cable management system as the intermediate mass 450 between the isolators 415, 417 not only provides high structural attenuations, but also minimizes the weight impact to the aircraft 300 and provides EMI protections for the wiring bundles 505.

FIG. 6 is a cross-sectional view of a cavity 600 between an aircraft's fuselage 301 and interior cabin closeout 325, in accordance with certain exemplary embodiments. Referring to FIG. 6, the cavity 600 includes a multitude of double-isolator systems 605 disposed in the cavity 600. Each double-isolator system 605 includes a first isolator 415 attached to the fuselage 301, a second isolator 417 attached to an interior closeout panel 325, and a cable management system 610 attached between the first and second isolators 415, 417. The cable management system 610 routes electrical cables and wiring bundles 505 through the cavity 600. The cable management system 610 also serves as the intermediate mass for each double-isolator system 605. In certain exemplary embodiments, the cable management system 610 includes an electrically conductive material that provides EMI shielding for the cables and wiring bundles 505 disposed in the cable management system 610. In certain exemplary embodiments, multiple cable management systems 610 are disposed in the cavity 600. In such embodiments, some double-isolator systems 605 may utilize different cable management systems 610 than other double-isolator systems 605.

Other structures also can be used as the intermediate mass for double-isolator systems 605, in place of or in addition to cable management systems 610. For example, table boxes, ducts, and other structures that exist between the fuselage and cabin structures also can be used as an intermediate mass.

In summary, the invention provides a multi-functional structural isolation system, which can provide high structural attenuation, minimal weight impact, and/or EMI protection for electrical cables. Although the above-described embodiments are discussed in terms of attenuation of vibrations and noise between a fuselage and an interior cabin, the exemplary double-isolator systems also can be used to attenuate vibrations and noise between other structures of an aircraft and non-aircraft structures. For example, the double-isolator system can be used to isolate exterior walls from interior cabinetry, ceiling mounts, hardware mounts, air handling systems, and flooring. In another example, the double-isolator system can be used to isolate a seat on a mobile vehicle from the floor of the vehicle. The double-isolator system also can be used to isolate components of automobiles, maritime vehicles, and other mobile and non-mobile objects.

One of ordinary skill in the art would appreciate that the invention provides an improved vibration isolation system for attenuating vibration energy between two aircraft structures, such as between the aircraft's fuselage and interior cabin. The vibration isolation system includes a first isolator attached to the first structure, a second isolator attached to the second structure, and an intermediate mass attached between the first and second isolators. The intermediate mass may be electrical cables, wiring bundles, a cable holder, or other component normally disposed between the two structures. Cable holder intermediate masses can be fabricated from an electrically conductive material to provide electromagnetic interference shielding for cables disposed therein. Multiple vibration isolator systems can be disposed between the fuselage and interior cabin to provide a less noisy cabin. Additional noise and vibration suppressors, such as skin damping material and acoustic blankets, also can be disposed between the fuselage and interior cabin to further reduce noise in the interior cabin.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A system for reducing noise in an aircraft cabin, comprising:
   a first vibration isolator attached to a fuselage of the aircraft;
   a second vibration isolator attached to an interior structure of the cabin; and
   an intermediate mass attached between the first isolator and the second isolator wherein the intermediate mass comprises a cable holder for holding electrical cables.

2. The aircraft of claim 1, wherein the first isolator is attached to the fuselage of the aircraft by being attached to at least one other component that is attached to the fuselage of the aircraft, and
   wherein the second isolator is attached to the interior structure of the cabin by being attached to at least one other component that is attached to the interior structure of the cabin.

3. The system of claim 1, wherein the cable holder comprises an electrically conductive material for shielding from electromagnetic interference.

4. The system of claim 1, wherein the intermediate mass comprises one or more electrical conductive cables.

5. The system of claim 1, further comprising an acoustic insulating material covering at least a portion of the fuselage's inner wall.

6. The system of claim 1, further comprising an acoustic insulation material covering at least a portion of an outer surface of the interior structure.

7. An aircraft, comprising:
   a fuselage comprising an inner wall and an outer wall;
   an interior cabin defined by an interior wall comprising an inner surface facing the cabin and an outer surface facing the inner wall of the fuselage;
   a cavity between the inner wall of the fuselage and the outer surface of the interior wall of the cabin; and
   a plurality of vibration isolators disposed in the cavity, each of the vibration isolators being attached between the inner wall of the fuselage and the outer surface of the interior wall of the cabin, and each of the vibration isolators comprising:
      a first isolator attached to the inner wall of the fuselage;
      a second isolator attached to the outer surface of the interior wall of the cabin; and
      an intermediate mass attached between the first isolator and the second isolator wherein the intermediate mass comprises a cable tray disposed in the cavity.

8. The aircraft of claim 7, wherein the first isolator is attached to the inner wall of the fuselage by being attached to at least one other component that is attached to the inner wall of the fuselage, and wherein the second isolator is attached to the outer surface of the interior wall of the cabin by being attached to at least one other component that is attached to the outer surface of the interior wall of the cabin.

9. The aircraft of claim 7, wherein the cable tray comprises an electrically conductive material for shielding from electromagnetic interference.

10. The aircraft of claim 7, wherein the intermediate mass comprises one or more cables disposed in the cavity.

11. The aircraft of claim 7, further comprising an acoustic insulating material covering at least a portion of the inner wall of the fuselage.

12. The aircraft of claim 7, further comprising an acoustic insulating material covering at least a portion of the outer surface of the interior wall of the cabin.

13. The aircraft of claim 7, wherein the fuselage is formed of a composite material.

14. An aircraft, comprising:
a fuselage comprising an inner wall and an outer wall;
an interior cabin defined by a cabin wall comprising an inner surface facing the cabin and an outer surface facing the inner wall of the fuselage;
a cavity between the inner wall of the fuselage and the outer surface of the cabin wall;
a cable holder comprising at least one cable holder section disposed in the cavity for holding one or more cables, wherein the cable holder comprises a cable tray; and
a plurality of vibration isolators disposed in the cavity, each of the vibration isolators comprising:
a first isolator attached between the inner wall of the fuselage and the cable holder; and
a second isolator attached between the outer surface of the cabin wall and the cable holder.

15. The aircraft of claim 14, wherein the first isolator is attached to the inner wall of the fuselage by being attached to at least one other component that is attached to the inner wall of the fuselage, and
wherein the second isolator is attached to the outer surface of the cabin wall by being attached to at least one other component that is attached to the outer surface of the cabin wall.

16. The aircraft of claim 14, wherein the cable holder comprises an electrically conductive material.

17. The aircraft of claim 14, further comprising an acoustic insulating material covering at least a portion of the inner wall of the fuselage.

18. The aircraft of claim 14, further comprising an acoustic insulating material covering at least a portion of the outer surface of the cabin wall.

19. The aircraft of claim 14, wherein the fuselage comprises a composite fuselage.

20. An aircraft, comprising:
a fuselage;
an interior structure disposed within the fuselage;
a plurality of vibration isolators disposed between the fuselage and the interior structure, each of the vibration isolators comprising:
a first isolator;
a second isolator; and
an intermediate mass disposed between the first isolator and the second isolator wherein the intermediate mass comprises a cable management device.

21. The aircraft of claim 20, wherein the first isolator is attached to the fuselage and to the intermediate mass, and
wherein the second isolator is attached to the interior structure and to the intermediate mass.

22. The aircraft of claim 21, wherein the first isolator is attached to the fuselage by being attached to at least one other component that is attached to the fuselage.

23. The aircraft of claim 21, wherein the second isolator is attached to the interior structure by being attached to at least one other component that is attached to the interior structure.

24. The aircraft of claim 20, wherein the interior structure comprises a cabin wall.

25. The aircraft of claim 20, wherein the interior structure comprises a support member.

26. The aircraft of claim 20, wherein the cable management device comprises a cable tray.

27. The aircraft of claim 20, wherein the intermediate mass comprises a cable bundle.

* * * * *